(12) United States Patent
Peng et al.

(10) Patent No.: US 9,419,337 B2
(45) Date of Patent: Aug. 16, 2016

(54) WIRELESS COMMUNICATION DEVICE

(71) Applicant: Wistron NeWeb Corporation, Hsinchu (TW)

(72) Inventors: Huang-Tse Peng, Hsinchu (TW); Hsiang-Feng Hsieh, Hsinchu (TW); Wen-Tsan Chung, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 0 days.

(21) Appl. No.: 14/255,969

(22) Filed: Apr. 18, 2014

(65) Prior Publication Data

US 2015/0200458 A1 Jul. 16, 2015

(30) Foreign Application Priority Data

Jan. 15, 2014 (TW) .............................. 103101485 A

(51) Int. Cl.
*H04B 1/40* (2015.01)
*H01Q 5/335* (2015.01)
*H04B 1/00* (2006.01)
*H04B 1/04* (2006.01)
*H04B 1/18* (2006.01)

(52) U.S. Cl.
CPC ............. *H01Q 5/335* (2015.01); *H04B 1/0053* (2013.01); *H04B 1/0458* (2013.01); *H04B 1/18* (2013.01)

(58) Field of Classification Search
USPC ....................... 455/77, 191.1, 191.2
See application file for complete search history.

(56) References Cited

U.S. PATENT DOCUMENTS

| 6,229,493 | B1* | 5/2001 | Iijima | H01Q 1/1278 343/704 |
| 2002/0193088 | A1* | 12/2002 | Jung | H03J 1/0008 455/191.2 |
| 2003/0222821 | A1* | 12/2003 | Mikkonen | H01Q 1/38 343/700 MS |
| 2013/0099993 | A1 | 4/2013 | Tung | |

FOREIGN PATENT DOCUMENTS

CN 201590488 U 9/2010

* cited by examiner

*Primary Examiner* — Hsin-Chun Liao
(74) *Attorney, Agent, or Firm* — Winston Hsu; Scott Margo

(57) ABSTRACT

A wireless communication device includes an antenna for receiving a receiving signal and including a radiator whose input impedance is inductively centralized, a tunable matching circuit coupled to the antenna for adjusting a matching of the antenna according to a control signal, and a radio-frequency processing circuit coupled to the tunable matching circuit, for determining whether to adjust the matching of the antenna according to a receiving band and a transmitting band corresponding to the receiving signal to generate the control signal to the tunable matching circuit, wherein the tunable matching circuit adjusts the matching of the antenna to optimize the matching of the antenna in the receiving band and the transmitting band.

5 Claims, 5 Drawing Sheets

WIRELESS COMMUNICATION DEVICE

BACKGROUND OF THE INVENTION

1. Field of the Invention

The present invention relates to wireless communication device, and more particularly to a wireless communication device capable of optimizing antenna matching by automatically adjusting the antenna matching.

2. Description of the Prior Art

An antenna is used for transmitting and receiving radio waves to exchange wireless signals. An electronic device having a function of wireless communication, such as a laptop computer, a personal digital assistant, and so on, may access wireless networks through the antenna. As wireless communication technology advances, operating frequencies for different communication systems may be different. An ideal antenna shall operate in as many operating frequency bands as possible for adapting to different communication systems. In addition, the ideal antenna should have a compact size to be integrated into a portable wireless communication device and meet a trend of small-sized portable wireless communication devices.

Nowadays, housing and mechanical parts of the portable wireless communication devices are made of metal for robustness, endurance and appearance considerations, and thus problems such as decreasing radiating efficiency or unstable antenna performance may be encountered when the antenna is integrated into the wireless communication device with metal housing. In such a situation, there is a difficulty in developing the antenna, an antenna designer has to face a challenge of a dilemma between the size and bandwidths of the antenna when the antenna is integrated into the metal housing.

In addition, a requirement of communication quality increases as wireless communication devices become more and more popular. Therefore, how to design the antenna with wide bandwidths to ensure the communication quality when the antenna is integrated into the wireless communication device with metal housing has become one of goals in the industry.

SUMMARY OF THE INVENTION

It is therefore an objective of the present invention to provide a wireless communication device capable of optimizing antenna matching by automatically adjusting the antenna matching to ensure communication quality.

An embodiment of the present invention discloses a wireless communication device that includes an antenna for receiving a receiving signal and includes a radiator whose input impedance is inductively centralized, a tunable matching circuit coupled to the antenna for adjusting a matching of the antenna according to a control signal, and a radio-frequency processing circuit coupled to the tunable matching circuit, for determining whether to adjust the matching of the antenna according to a receiving band and a transmitting band corresponding to the receiving signal to generate the control signal to the tunable matching circuit, wherein the tunable matching circuit adjusts the matching of the antenna to optimize the matching of the antenna in the receiving band and the transmitting band.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
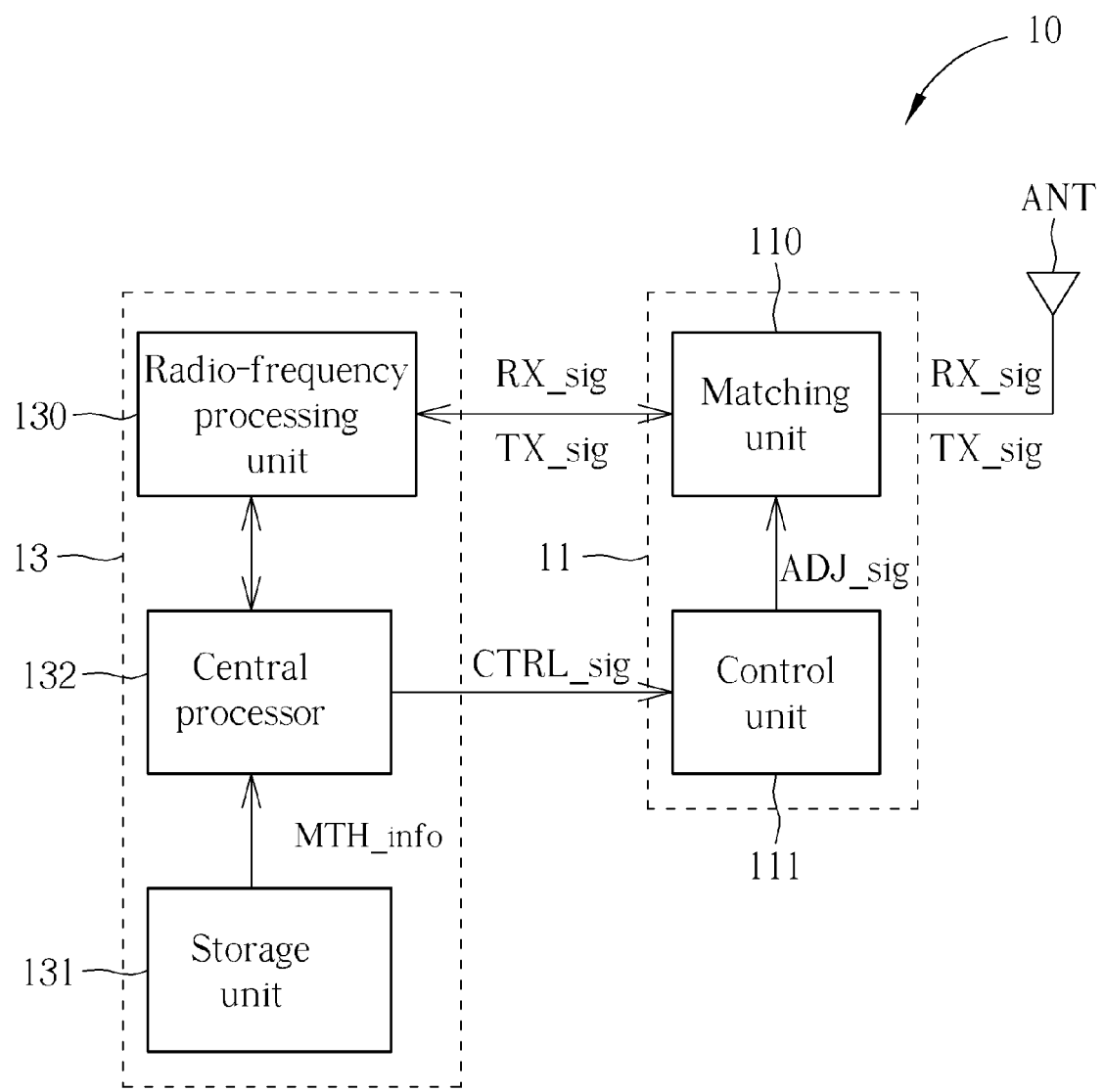
FIG. 1 is a schematic diagram of a wireless communication device according to an embodiment of the present invention.

Please refer to FIG. 1, which is a schematic diagram of a wireless communication device 10 according to an embodiment of the present invention. The wireless communication device 10 may be a mobile device having a wireless communication function, such as a mobile phone, a tablet computer, a laptop computer and so on. The wireless communication device 10 includes an antenna ANT, a tunable matching circuit 11 and a radio-frequency processing circuit 13. The antenna ANT is used for receiving a receiving signal RX_sig. The tunable matching circuit 11 is coupled to the antenna ANT for adjusting a matching of the antenna ANT according to a control signal CTRL_sig. The radio-frequency processing circuit 13 is coupled to the tunable matching circuit 11 for determining whether to adjust the matching of the antenna ANT according to a receiving band and a transmitting band corresponding to the receiving signal RX_sig, to generate the control signal CTRL_sig to the tunable matching circuit 11.

The tunable matching circuit 11 includes a matching unit 110 and a control unit 111. The matching unit 110 is coupled between the antenna ANT and the radio-frequency processing circuit 13 for matching the antenna ANT. The control unit 111 is coupled to the radio-frequency processing circuit 13 and the matching unit 110 for outputting an adjusting signal ADJ_sig according to the control signal CTRL_sig to the matching unit 110, so as to control an operation of the matching unit 110.

The radio-frequency processing circuit 13 includes a radio-frequency processing unit 130, a storage unit 131 and a central processor 132. The radio-frequency processing unit 130 is used for processing the receiving signal RX_sig to retrieve data being accessed by the central processor 132. The storage unit 131 is used for storing a matching information MTH_info. The central processor 132 is coupled to the radio-frequency processing unit 130 and the storage unit 131 for determining if the current matching of the antenna ANT is optimized or not according to the receiving and transmitting bands corresponding to the receiving signal RX_sig, so as to decide whether to adjust the matching of the antenna ANT. If the matching of the antenna ANT is not optimized, the central processor 132 accesses the matching information MTH_info from the storage unit 131 to generate the control signal CTRL_sig to the control unit 111. In addition, the radio-frequency processing circuit 13 is further used for generating the transmitting signal TX_sig to the antenna ANT according to data outputted from the central processor 132, such that the antenna ANT transmits the transmitting signal TX_sig to realize wireless communication between the wireless communication device 10 and base stations.

In operation, when a user enables the wireless communication function of the wireless communication device 10, the wireless communication device 10 receives the receiving signal RX_sig from the base stations in the environment by the antenna ANT, and the radio-frequency processing unit 130 then demodulates the receiving signal RX_sig to get a carrier frequency of the receiving signal RX_sig or a measurement report reported from the base stations, e.g. received signal strength indication (RSSI), to generate the detection result DET_rst to the central processor 132. The central processor 132 then determines whether to adjust the matching of the antenna ANT. If the matching of the antennas requires to be adjusted, the central processor 132 accesses the matching information MTH_info from the storage unit 131 to generate the control signal CTRL_sig to the control unit 111. The control unit 111 generates the adjusting signal ADJ according to the control signal CTRL_sig to the matching unit 110 to adjust the matching of the main antenna ANT.

Under the operation as mentioned above, the wireless communication device 10 may always detect the receiving signal from any base stations to determine whether the matching of the antenna currently in use is proper or not, thereby automatically and dynamically adjust the matching of the antenna in order to optimize the matching of antenna when the wireless communication function of the wireless communication device 10 is turned on and the wireless communication device 10 is being moved around. As a result, the tunable matching circuit may effectively broaden the bandwidth of the antenna and optimize the matching of the antenna to ensure wireless communication quality. Those skilled in the art may make modifications and alterations accordingly, which is not limited.

Figure 2:
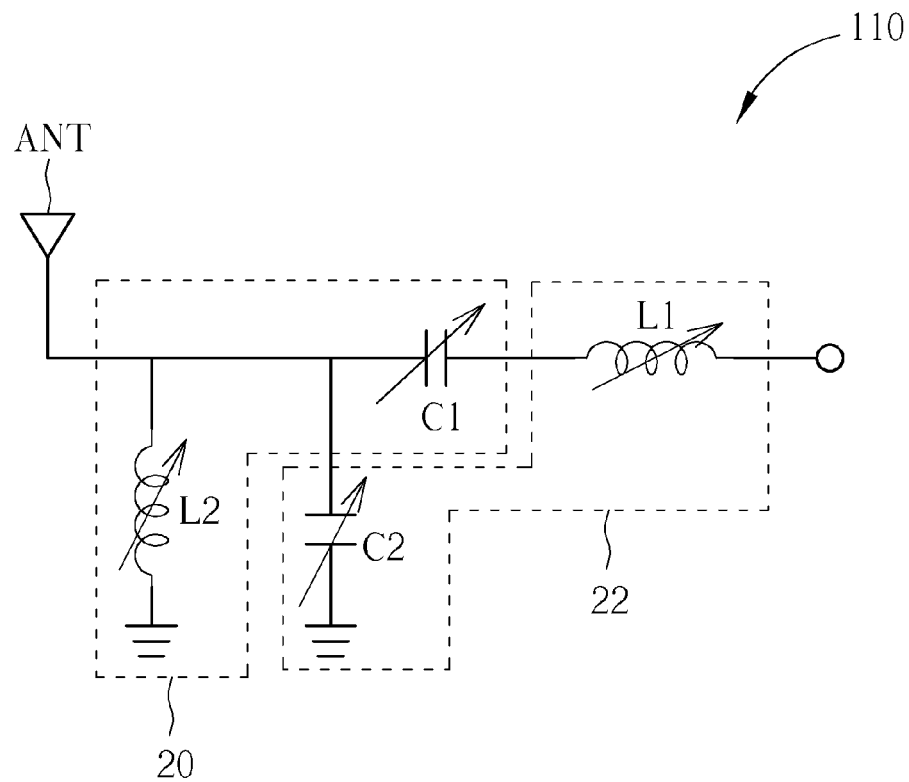
FIG. 2 is a schematic diagram of the matching unit shown in FIG. 1 according to an embodiment of the present invention.

For example, pleases refer to FIG. 2, which is a schematic diagram of the matching unit 110 according to an embodiment of the present invention. The matching unit 110 includes capacitors C1 and C2 and inductors L1 and L2. A structure of the matching unit 110 is shown in FIG. 2. The capacitor C1 and the inductor L2 function as a filter or a low-frequency adjusting unit 20, and the tunable matching circuit 11 may adjust both or one of a capacitance of the capacitor C1 and an inductance of the inductor L2 to adjust the matching of the antenna ANT in a low frequency band. On the other hand, the capacitor C2 and the inductor L1 functions as another filter or a high-frequency adjusting unit 22, and the tunable matching circuit 11 may adjust both or one of a capacitance of the capacitor C2 and an inductance of the inductor L1 to adjust the matching of the antenna ANT in a high frequency band.

The matching information MTH_info may include the capacitances of the capacitors C1 and C2 and the inductances of the inductors L1 and L2 corresponding to the operating frequency bands and the wireless communication system SYS which the antenna ANT operates. The capacitors C1 and C2 and the inductors L1 and L2 are electrically tunable to adjust their capacitances and inductances according to the adjusting signal ADJ_sig, wherein the capacitances of the capacitors C1 and C2 are tunable in a range from 0.2 to 15 picofarads, and the inductances of the inductors L1 and L2 are tunable in a range from 1 to 33 nanohenries.

Figure 3:
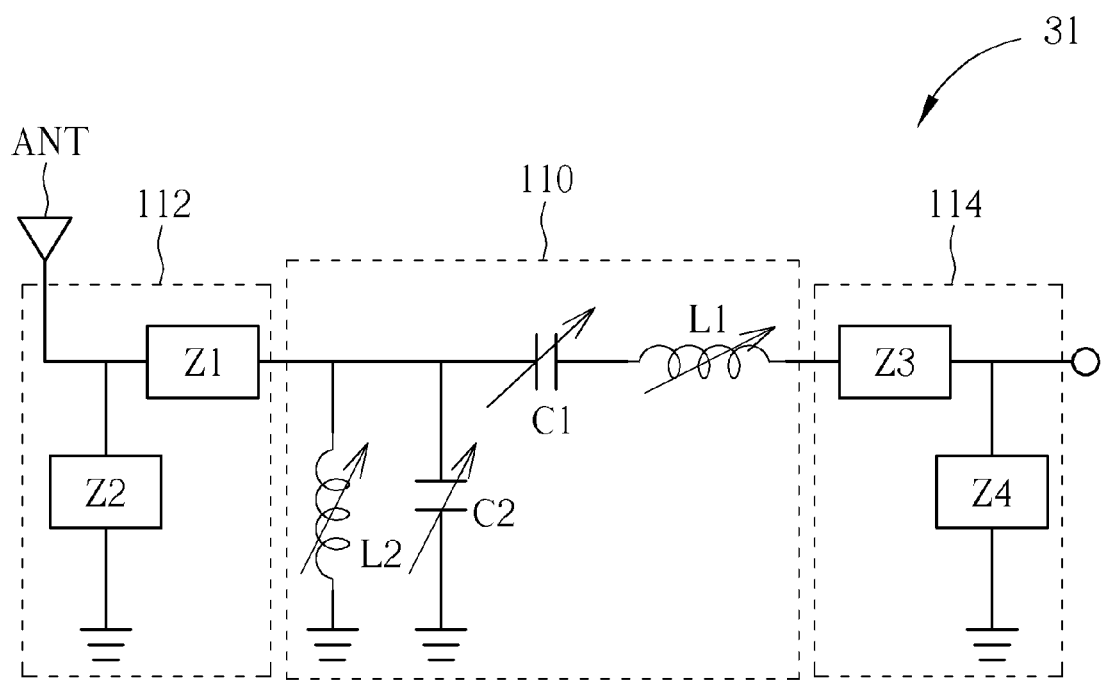
FIG. 3 is a schematic diagram of a tunable matching circuit according to another embodiment of the present invention.

Moreover, the matching unit 110 may cooperate with fixed matching units having fixed input impedances to improve a design flexibility and precision for adjusting the matching of the antenna. Please refer to FIG. 3, which is a schematic diagram of a tunable matching circuit 31 according to another embodiment of the present invention. The tunable matching circuit 31 includes the matching units 110, 112 and 114 and the control unit 111 (not shown in FIG. 3). The matching unit 112 is coupled between the antenna ANT and the matching unit 110, and includes passive elements Z1 and Z2 having fixed electrical parameters or characteristic impedances. The matching unit 114 is coupled between the matching unit 110 and the radio-frequency processing circuit 13, and includes passive elements Z3 and Z4 having fixed electrical parameters or characteristic impedances. The matching units 112 and 114 are but not limited to L-type matching circuits. The matching units 112 and 114 may be any types of matching circuits, such as single passive element, a T-type matching circuit or Pi (Π)-type matching circuit, etc. Of course, locations and configurations where the matching unit is disposed has no limitations, a designer may configure only one tunable matching unit 110, or configure the tunable matching unit 110 with one or more fixed matching units 112 and 114 having fixed input impedances according to practical requirements.

Figure 4:
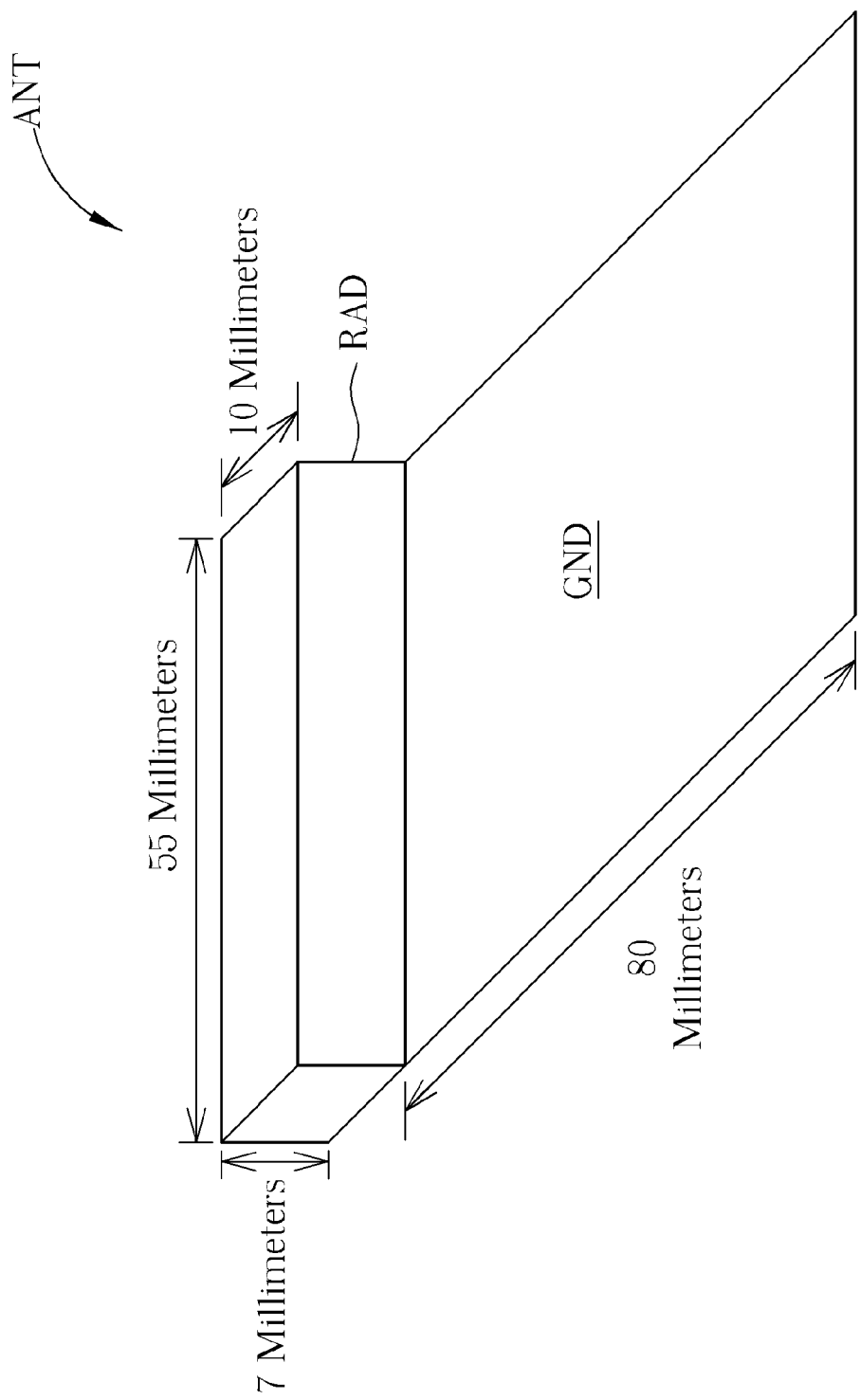
FIG. 4 illustrates an appearance of the antenna shown in FIG. 1 according to an embodiment of the present invention.

Please refer to FIG. 4, which illustrates an appearance of the antenna ANT according to an embodiment of the present invention. The antenna ANT includes a radiator RAD and a ground unit GND. The ground unit GND is coupled to the radiator RAD, and the radiator RAD receives the receiving signal RX_sig from the air and radiates the transmitting signal TX_sig into the air.

Please note that when the antenna is integrated into a housing (not shown in FIG. 4) of the wireless communication device 10, there are conductors such as circuit boards, a display, transmission lines or some metal parts inside the housing, which are prone to induce a coupling effect with the radiator of the antenna to generate parasitic capacitors between the radiator and the conductors in the housing. If a capacitance of the parasitic capacitor is greater, adjusting the matching of the antenna by the tunable matching circuit is more difficult, which is due to the tunable matching circuit being unable to effectively adjust the matching of the antenna when the capacitance of the parasitic capacitance is much greater than its adjusting range. On the contrary, if the capacitance of the parasitic capacitor is smaller, adjusting the matching of the antenna by the tunable matching circuit is easier.

On the other hand, various coupling resonant modes of an inverted-F antenna (IFA) or planar inverted-F antenna (PIFA) may be induced based on a distance between its feed and ground terminals, the resonant modes includes under-coupled, critical-coupled and over-coupled. Input impedances of antennas which are under coupled are inductively centralized, which means the parasitic capacitance is quite small, such that the matching of the antenna is easier to be effectively adjusted by the tunable matching circuit.

Accordingly, the antenna ANT is a PIFA or an IFA. Meanwhile, when the antenna ANT is disposed in the housing of the wireless communication device 10, the input impedance of the radiator RAD is inductively centralized before the antenna ANT is coupled to the tunable matching circuit 11, such that the matching of the antenna is easier to be effectively adjusted by the tunable matching circuit.

Figure 5:
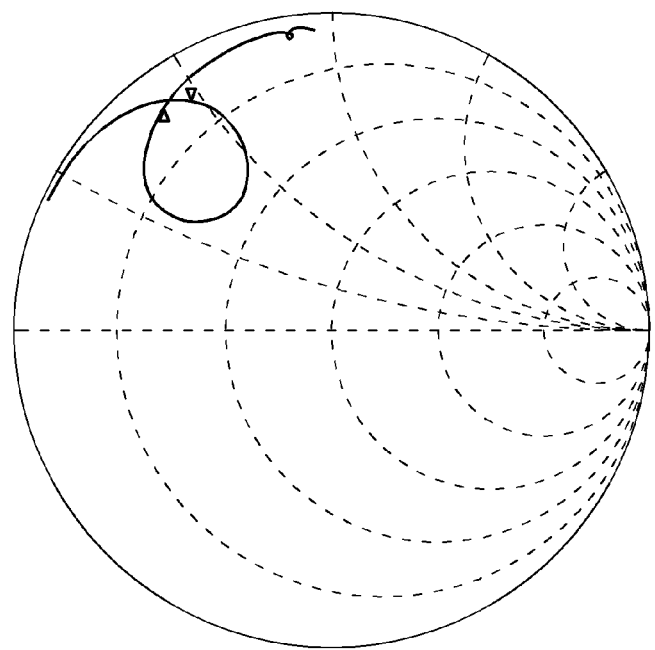
FIG. 5 and FIG. 6 illustrate a Smith chart and a voltage standing wave ratio of an antenna radiator, respectively.
Figure 6:
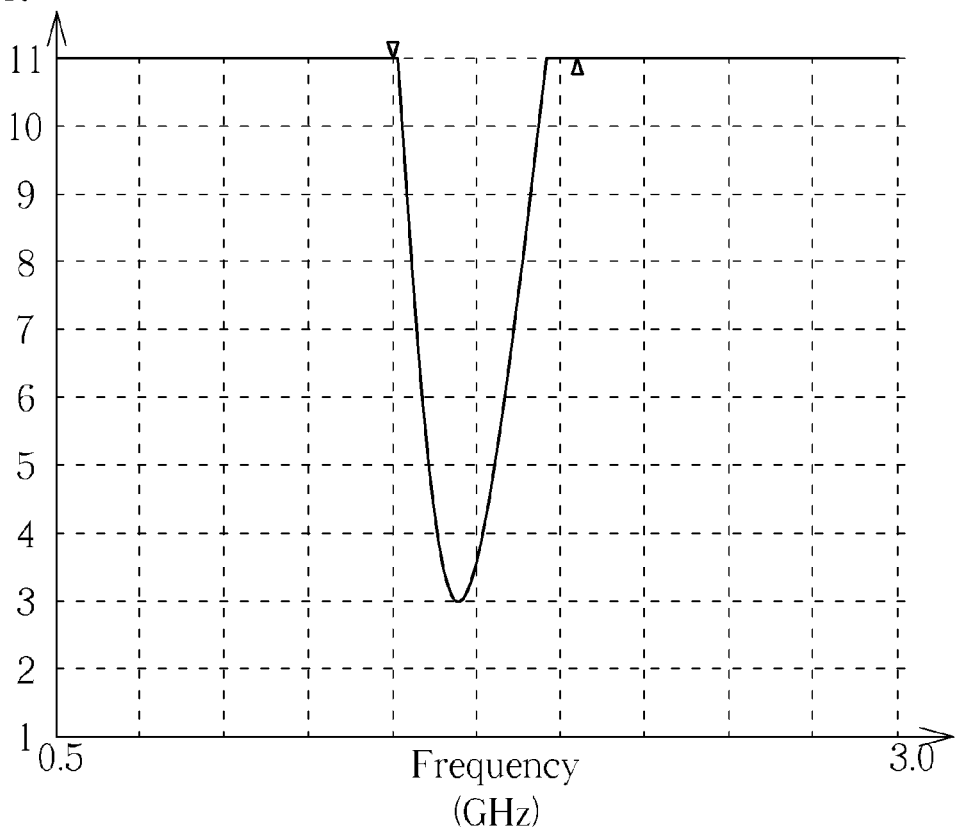

Take the antenna and the wireless communication device for operating in a long term evolution (LTE) communication system for example. Please refer to FIG. 5 and FIG. 6, which illustrate a Smith chart and a voltage standing wave ratio (VSWR) of an antenna radiator, respectively. The designer disposes an IFA or PIFA in the housing, and tunes an input impedance of the antenna radiator (i.e. the radiator RAD) to be inductively centralized. A test waveform completely lies in an upward area of the Smith chart shown in FIG. 5, which means the input impedance of the antenna radiator does not include any capacitive components to be inductively centralized. In FIG. 6, the designer tunes a minimum point of the VSWR pattern corresponding to a central frequency (about 2 GHz) of the operating bands of the LTE system (i.e. 704~960 MHz and 1710~2700 MHz). The designer then couples the antenna ANT to the tunable matching circuit 11 or 31, and set ups specific circuit structures and electric configurations of the matching units 110, 112 and 114. In some embodiments, the designer may set up the matching units 112 and 114 having the fixed electric parameters first, such that the antenna matching of the antenna ANT at certain frequency or frequency bands may be properly adjusted and optimized by the tunable matching unit 110, which allows the designer to realize the antenna and the wireless communication device for the LTE system.

Figure 7:
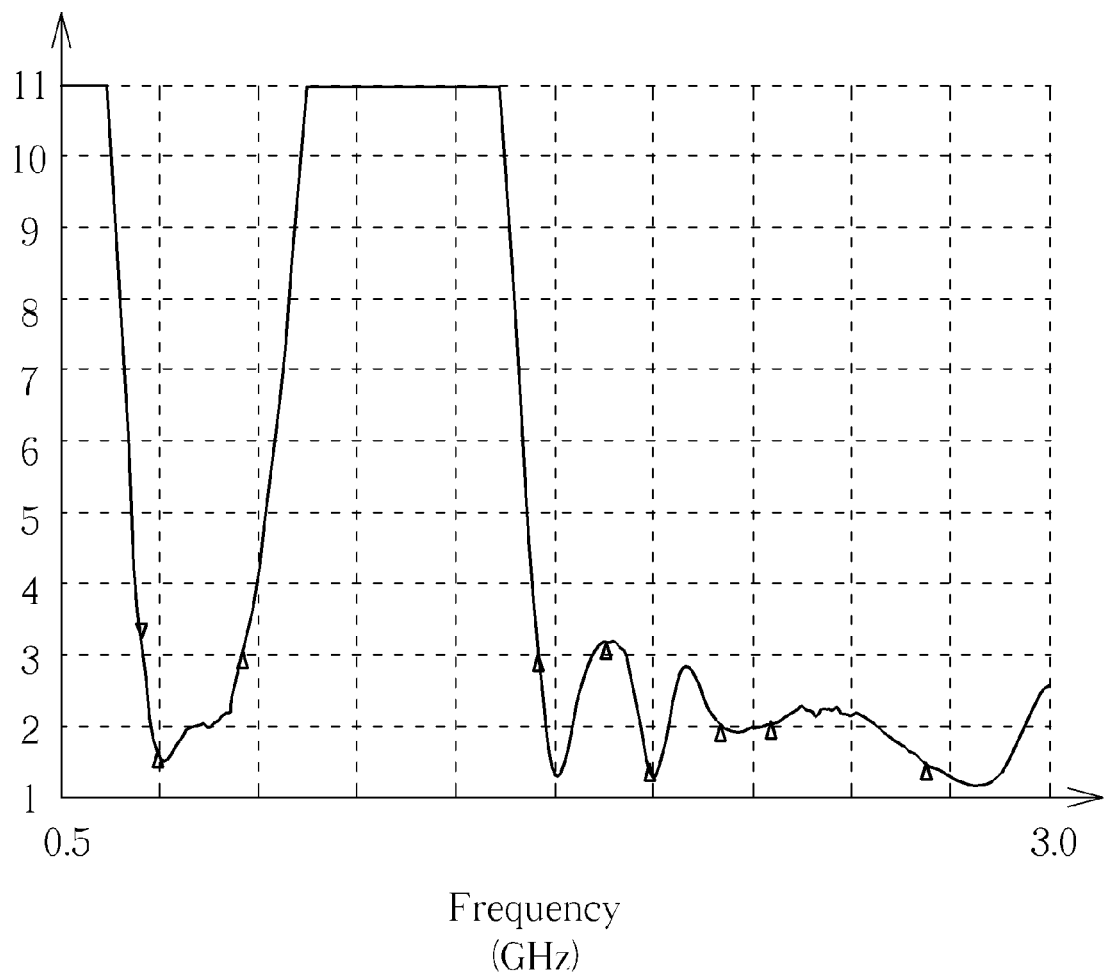
FIG. 7 illustrates a voltage standing wave ratio of the antenna shown in FIG. 1 cooperating with the tunable matching circuit shown in FIG. 3.

Please refer to FIG. 7, which illustrates a VSWR of the antenna ANT cooperating with the tunable matching circuit 31. As shown in FIG. 7, within the operating frequency bands of the LTE system, the VSWR of the antenna ANT is lower or around 3, which means the antenna ANT is able to transmit and receive radio waves in the operating frequency bands of the LTE system.

Therefore, an embodiment of the present invention provides a developing process for antenna designers to design a tunable antenna adapting to different models or types of wireless communication devices. The developing process includes the following Steps:

Step (1): Dispose an antenna radiator in a housing and make an input impedance of the antenna radiator to be inductively centralized corresponding, or close, to a central frequency of one or more operating frequency bands.

Step (2): Couple the antenna radiator to a matching unit, and setup an adjusting range and electric configuration of the tunable matching unit, such that the antenna performance, such as the input impedance and VSWR, varies according to the operation of the matching unit.

Please note that the designer may couple the antenna radiator to a fixed matching unit and set up its electric configuration to make effective input impedance and the VSWR of the antenna radiator are roughly in-band after Step (1) is finished and before performing Step (2). Then, when performing Step (2), the designer may tune the antenna performance at certain frequency or frequency bands to improve a precision and flexibility for adjusting the antenna matching that the tunable matching circuit can achieve.

In addition, please refer to FIG. 4 again, a volume of the radiator RAD is substantially smaller or equal to 55*10*7 cubic millimeters, and an area of the ground unit GND is substantially smaller or equal to 55*80 square millimeters. The designer may follow the developing process to integrate the antenna into the housing of the wireless communication device based on the spatial range as above mentioned, thereby the tunable matching circuit may automatically adjust the matching of the antenna to ensure the matching of the antenna is optimized. As a result, the antenna may be integrated into the housing of the wireless communication device and meet requirements of bandwidths and communication quality.

To sum up, the wireless communication device of the present invention may always detect the receiving signal from any base station to determine whether the matching of the antenna currently in use is proper or not, thereby automatically and dynamically adjust the matching of the antenna in order to optimize the matching of antenna. In implementation for realizing the tunable antenna, the present invention provides a developing process for antenna designers to design a tunable antenna, the designer may follow the developing process to integrate the antenna into the housing of the wireless communication device based on the spatial range as above mentioned, thereby the tunable matching circuit may automatically adjust the matching of the antenna to ensure the matching of the antenna is optimized. As a result, the antenna may be integrated into the housing of the wireless communication device and meet requirements of bandwidths and communication quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device, comprising:
   an antenna for receiving a receiving signal and including a radiator;
   a tunable matching circuit coupled to the antenna for adjusting a matching of the antenna according to a control signal; and
   a radio-frequency processing circuit coupled to the tunable matching circuit, for determining whether to adjust the matching of the antenna according to a receiving band and a transmitting band corresponding to the receiving signal to generate the control signal to the tunable matching circuit;
   wherein the tunable matching circuit adjusts the matching of the antenna to optimize the matching of the antenna in the receiving band and the transmitting band;
   wherein an input impedance of the radiator is inductively centralized before the antenna is coupled to the tunable matching circuit;
   wherein the tunable matching circuit further comprises:
      a second matching unit coupled between the antenna and a first matching unit; and
      a third matching unit coupled between the first matching unit and the radio-frequency processing circuit;
      wherein the second and third matching units are L-type matching circuits and input impedances of the second and third matching units are fixed.

2. The wireless communication device of claim 1, wherein the tunable matching circuit comprises:
   the first matching unit coupled between the antenna and the radio-frequency processing circuit for matching the antenna; and
   a control unit coupled to the radio-frequency processing circuit and the first matching unit for outputting an adjusting signal according to the control signal to the first matching unit to adjust the matching of the antenna.

3. The wireless communication device of claim 1, wherein the radio-frequency processing circuit comprises:
   a radio-frequency processing unit for processing the receiving signal and generating the transmitting signal;
   a storage unit for storing a matching information; and
   a central processor coupled to the radio-frequency processing unit and the storage unit for accessing the matching information according to the receiving band and the transmitting band to generate the control signal, and controls the radio-frequency processing unit to generate the transmitting signal to the antenna.

4. The wireless communication device of claim 1, wherein the antenna is a planar inverted-F antenna or an inverted-F antenna.

5. The wireless communication device of claim 1, wherein the antenna comprises:

the radiator for receiving the receiving signal and transmitting the transmitting signal, wherein a volume of the radiator is substantially smaller than 55*10*7 cubic millimeters; and a ground unit coupled to the radiator, wherein an area of the ground unit is substantially smaller than 55*80 square millimeters.

\* \* \* \* \*